United States Patent [19]

Ito

[11] Patent Number: 5,298,273

[45] Date of Patent: * Mar. 29, 1994

[54] METHOD OF PRODUCING AN EDIBLE CONTAINER

[76] Inventor: Sadaharu Ito, 30-5, Saginomiya 1-chome, Nakano-ku, Tokyo, Japan

[*] Notice: The portion of the term of this patent subsequent to Feb. 8, 2011 has been disclaimed.

[21] Appl. No.: 983,437

[22] Filed: Dec. 3, 1992

Related U.S. Application Data

[63] Continuation-in-part of Ser. No. 921,324, Jul. 29, 1992.

[30] Foreign Application Priority Data

Jul. 10, 1992 [JP] Japan .................. 4-207274

[51] Int. Cl.$^5$ ............................................ A21D 13/08
[52] U.S. Cl. ...................... 426/549; 426/138; 426/139
[58] Field of Search .................. 426/139, 138, 549

[56] References Cited

U.S. PATENT DOCUMENTS

| | | | |
|---|---|---|---|
| 4,927,655 | 5/1990 | Ito | 426/138 |
| 4,927,656 | 5/1990 | Ito | 426/138 |

FOREIGN PATENT DOCUMENTS

| | | |
|---|---|---|
| 38-6554 | 5/1963 | Japan . |
| 50-82277 | 7/1975 | Japan . |
| 59-109127 | 6/1984 | Japan . |
| 61-149036 | 7/1986 | Japan . |
| 4-219839 | 7/1992 | Japan . |
| 4-270884 | 9/1992 | Japan . |
| 4-270885 | 9/1992 | Japan . |

*Primary Examiner*—Donald E. Czaja
*Assistant Examiner*—Mary S. Mims
*Attorney, Agent, or Firm*—Nixon & Vanderhye

[57] ABSTRACT

Edible containers suitable for containing frozen confections (e.g., ice cream, frozen yogurt and the like) and other food products are made by initially baking a dough which consists essentially of sugar, oil and flour between a pair of heated platens to achieve a dewatered initially baked edible sheet. The initially baked sheet is then moisturized (e.g., by spraying water onto one or both surfaces of the sheet) to increase the moisture content of the sheet preferably to between 10 to 15 wt. %. The moisturized and initially baked edible sheet may then be packaged either singly or in a stack (e.g., 10 or more such sheets) within a non-water-absorptive packaging material. If packaged in a stack, a non-stick peelable sheet (e.g., silicone-coated paper) is interposed between adjacent edible sheets in the stack. The package may be opened at the point of sale and subjected to final baking and forming. In this connection, immediately after the final baking step, the finally baked sheet retains sufficient flexibility for forming into cup-shaped, dish-shaped and cone-shaped containers. Upon cooling, the edible containers will be crispy.

15 Claims, 5 Drawing Sheets

METHOD OF PRODUCING AN EDIBLE CONTAINER

RELATED APPLICATIONS

This application is a continuation-in-part of U.S. patent application Ser. No. 07/921,324 filed on Jul. 29, 1992, and is related to U.S. Pat. Nos. 4,927,655 and 4,927,656 (the entire contents of said application and patents being expressly incorporated hereinto by reference).

BACKGROUND AND SUMMARY OF THE INVENTION

Edible containers and sheet-like edible base materials are sold in a form suitable to contain frozen confections and desserts, such as ice cream, ice milk, frozen yogurt and the like. These edible containers and sheet-like edible base materials are typically delivered to the retail establishments where the frozen desserts are sold by their respective manufacturers.

Typical edible containers consist of sheet-like containers in which a large amount of water is blended with raw ingredients, such as wheat flour, cooking oil, sugar and the like, and then kneaded to form a dough that is baked on a high-temperature heated platen. The containers may take a variety of shapes and/or forms, such as waffle cones and cup-shaped waffle cups in which the sheet-like baked dough is formed into the shape of a cone and cup, respectively, as well as dish-shaped edible containers adapted to contain tart confections and the like.

Waffles, wafers, waffle cups and edible dishes for frozen desserts and/or tart confections are characteristically crispy and, since they are brittle, are susceptible to breakage during storage and transport prior to use. There are numerous difficulties encountered in the handling of such edible containers during shipment from the factory following baking as well as after shipment during delivery to ice cream and confection stores. In order to eliminate these problems, one method of producing an edible container has been previously developed by the present applicant and is described in Japanese Published Application No. 4-148638.

However, according to the technique disclosed in such Japanese published application, the moisturized molded sheets discharged from the moisturizing process will have a sticky surface. As a result, they cannot be sent to the final heating step without first having been individually spread out and dried. As such, a long period of time (e.g. on the order of roughly six hours) is required in order for the above-mentioned drying step to be accomplished. Additional problems include the formation of mold or excessive drying resulting in breakage due to considerable changes in the moisture content attributable to atmosphere changes during drying.

Broadly, the present invention relates to a method of producing a shallow dish-shaped, cup-shaped or cone-shaped edible container in which frozen confections, such as soft or hard ice cream, ice milk tart confections and like types of food products are placed. More particularly, this invention relates to an edible porous food container having a small apparent specific gravity which is lightweight and preferably exhibits a crispy texture when eaten.

In order to eliminate the problems noted previously, the present invention is especially characterized by sealing each of the moisturized molded sheets in a moisture-proof state for shipment. When a large number of moisturized sheets is required, the sheets are stacked and collectively sealed within a moisture-proof package in an integrated form to thereby prevent product contamination by microbes and loss due to breakage during the distribution and storage process. Preferably, non-water-absorptive peelable sheets are interposed between individual moisturized molded sheets in the stack during shipment. The sanitary edible containers are thus delivered to the point of use and are then formed and solidified into dishes, cup-shaped and cone-shaped edible containers after being subjected to a baking and softening step using a relatively low amount of energy.

Further aspects and advantages of this invention will become more clear after careful consideration is given to the following detailed description thereof.

BRIEF DESCRIPTION OF THE ACCOMPANYING DRAWINGS

Reference will hereinafter be made to the accompanying drawings wherein like reference numerals throughout the various Figures denote like structural elements, and wherein.

DETAILED DESCRIPTION OF THE PREFERRED EXEMPLARY EMBODIMENTS

Figure 1:
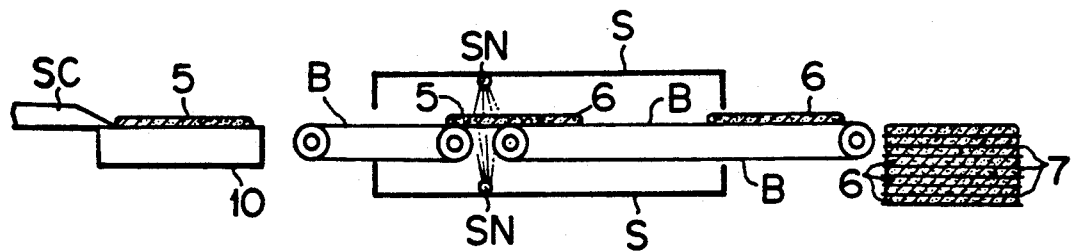
FIG. 1 is a schematic representation of a preferred procedure for making softened molded sheets according to the present invention.

The method of producing an edible container according to the present invention involves sandwiching a farinaceous batter mixture consisting essentially of sugar, oil and flour between a pair of heated platens and then heating and baking the batter mixture to effect alphatization of the starch and to evaporate moisture. Thus, after initial baking, a de-watered edible sheet of baked batter will result. The de-watered edible sheet of baked batter will then be re-moisturized (e.g., by application of a water spray). The now moisturized, initially baked sheet will then be sealed within a non-water-absorptive packaging material, and if a stack of moisturized baked sheets are packaged together, then non-water-absorptive sheets will be interposed between individual ones of the baked sheets. The moisturized and baked sheets will become softened within the sealed packaging material by moisture infiltration such that, when the softened and moisturized baked sheets are removed from the packaging, they may be molded into a suitable container and finally baked to form a crispy edible container for frozen confections and other food products.

Baked molded sheets having a moisture content of roughly 3% can be made by heating edible dough using a heated platen at a temperature of roughly 170°–220° C. As the moisture content of the molded sheet is low, it can be easily removed from the heated platen with a scraper or similar tool. Furthermore, since the removed molded sheet becomes hard and brittle making it susceptible to breakage if it is cooled as is, according to the present invention, roughly 2 grams of water are sprayed onto the molded sheets following initial baking until a weight of, for example, 20 grams per sheet is obtained. Thus, following removal of the initially baked sheet from the baking apparatus the moisture content of the sheet will be increased to roughly 10–15% by weight by spraying water thereon. The moisturized sheets are then sealed in moisture-resistant packages thereby allowing the sheets to be stored or transported.

The moisturized molded sheets become uniformly covered with moisture due to infiltration of moisture in the non-water-absorbant (moisture-impermeable) packages with the passage of time and thereby become softened molded sheets that are flexible to an extent that they can be bent. Thus, the softened sheets are easily handled, such as during storage or transport to users, and the like. These softened molded sheets are free of breakage and cracking and are also sanitary since there is no contamination by microbes or mold growth.

The ultimate users perform the final baking so as to heat and dry the softened molded sheets that have been transported in order to form them into edible dishes, cup-shaped and cone-shaped containers and the like. Since the contained water of these softened molded sheets at this time is nearly entirely in the form of dampness that adheres to the surface of the matrix, thermal transformation of the matrix of the baked sheets is not required for drying and removal of moisture. Thus, in comparison to the baked sheets that were initially prepared to have a moisture content of 10–15% in the form of internally contained (i.e., structural) water, the amount of time required for the above-mentioned final baking and drying can be reduced significantly, and the amount of electrical power used by the heater per sheet can be reduced to only about one-third of that conventionally employed.

Sanitary edible containers can be made and sold simply by cooling and solidifying the baked softened sheets after they are formed into dish-shaped and cup-shaped edible containers immediately after softening due to the softening liquid action of the contained sugar and oil accompanying the above-mentioned baking and drying.

The following provides an explanation of embodiments of the present invention with reference to the drawings.

Figure 2:
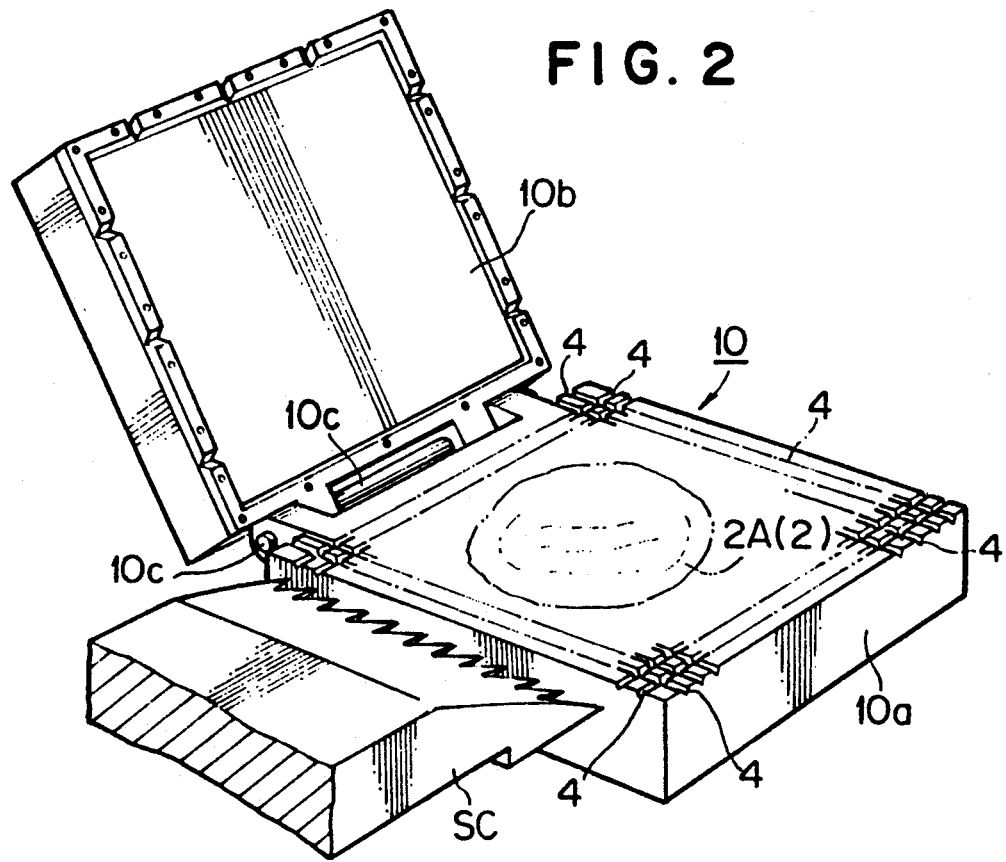
FIG. 2 is a perspective view of a suitable baking apparatus used in the method of the present invention.
Figure 3A:
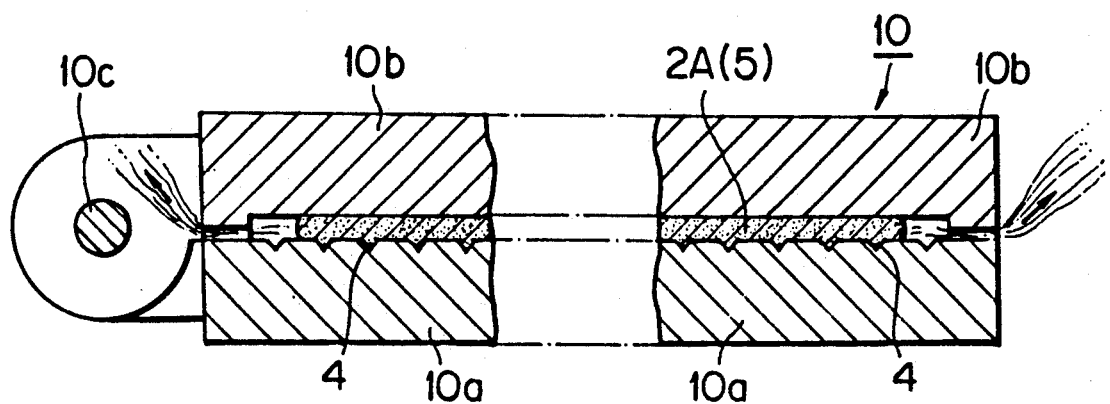
FIG. 3A is a cross-sectional view with a portion omitted showing an example of the manner in which the baking apparatus depicted in FIG. 2 may be used.

The basic method of producing the edible container of the present invention first involves pouring and spreading out dough 2 onto a heating plate 10 as shown in FIG. 2. The dough is a raw batter material in which equal amounts of wheat flour and water are mixed and kneaded followed by addition and mixing of suitable amounts of sugar and oil. It may be possible, in this case, to place a dough which contains less water in the molded sheet onto the heating plate 10. Kneaded dough 2A on the heating plate 10 is sandwiched between a pair of heated platens 10a and 10b as indicated in FIG. 3A, and is initially baked at about 180° C. for roughly 90 seconds to an extent by which the wheat starch contained in the kneaded dough 2A is alphatized and the moisture therein is sufficiently evaporated.

Figure 3B:
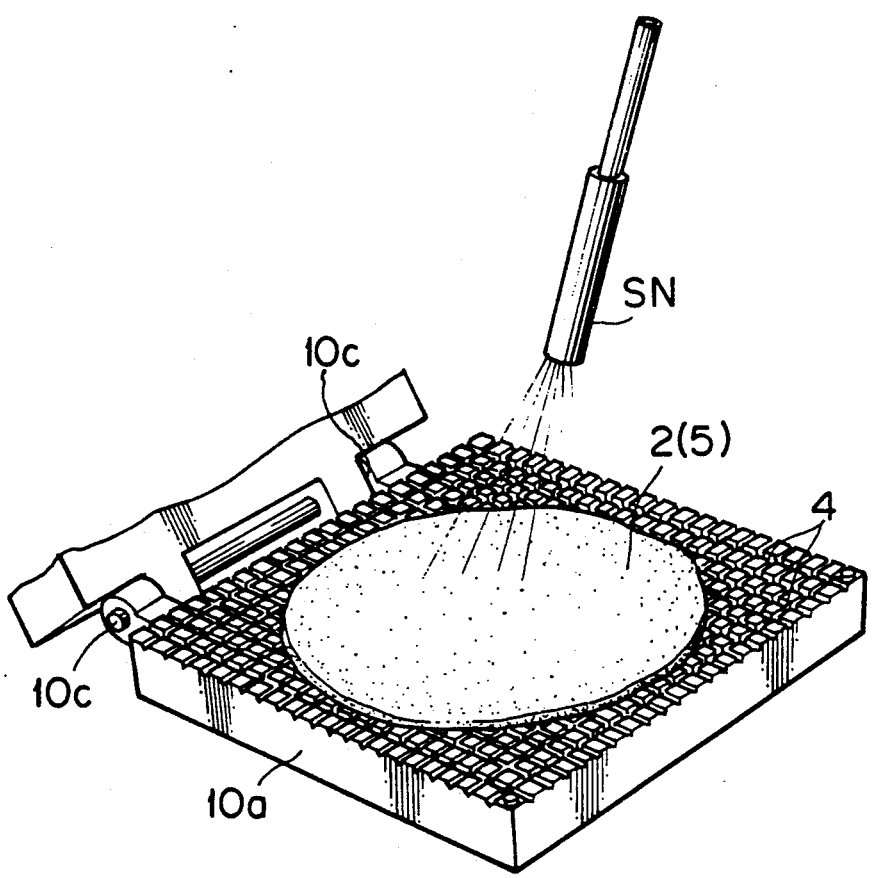
FIG. 3B is a perspective view with a portion omitted showing a water spray being applied onto the molded sheet on a suitable baking apparatus
Figure 4:
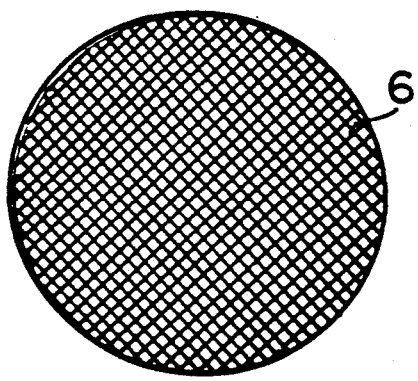
FIG. 4 is a perspective view of a typical moisturized edible molded sheet.

The initially baked and molded sheet (now designated by reference numeral 5) is then peeled from the heating plate 10 with scraper SC as indicated in FIGS. 1 and 2 while dry, and is transported by belt conveyor B to a subsequent moisturization spray chamber S. The molded sheet 5, weighing roughly 20 grams per sheet, that has been transported to the spray chamber S has a moisture content of roughly 3%. According to the present invention, as a result of coating the molded sheet 5 with water in advance by spraying roughly 2 grams of water on both sides of the sheet 5 with upper and lower spray nozzles SN in the spray chamber S as indicated in FIG. 1, a moisturized initially baked and molded sheet (now designated by reference numeral 6) can be obtained. Such a sheet 6 is more specifically depicted in FIG. 4. It may also be possible to spray water directly with spray nozzles SN on the heating plate 10a as indicated in FIG. 3B.

Figure 5:
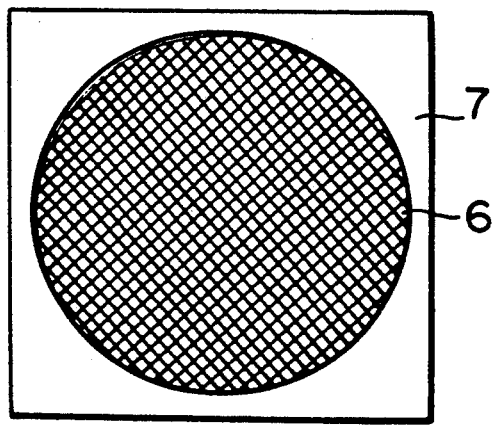
FIG. 5 is a perspective view indicating one example of a moisturized edible molded sheet on a non-water-absorbant peelable sheet.
Figure 6A:
FIG. 6A is a cross-sectional view of an individually package and sealed moisturized edible molded sheet.
Figure 6B:
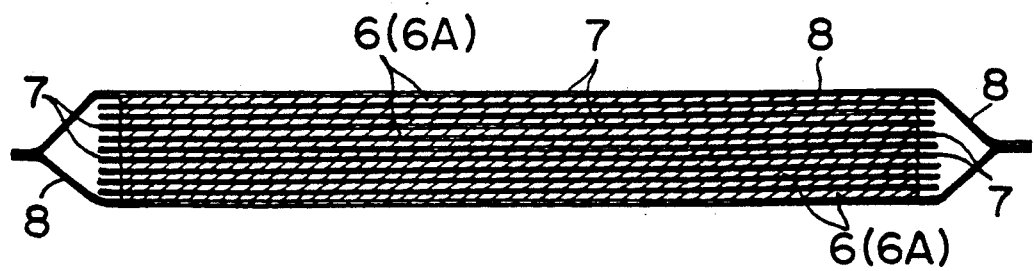
FIG. 6B is a cross-sectional view of a sealed and packaged stack of moisturized edible molded sheet with non-water-absorbant sheets interposed therebetween.

The moisturized molded sheet 6 is individually packed and sealed in a non-moisture-absorbant package 8 as indicated in FIG. 6A. Alternatively, the moisturized molded sheet 6 may be placed on top of non-moisture-absorbant peelable sheet 7 (such as silicon-coated paper or like non-stick film material) using a commonly known conveyor means as indicated in FIG. 1. Thus, the product form indicated in FIG. 5 results. These moisturized molded sheets can then be stored or shipped to users, such as ice cream retailers, by stacking and sealing a large number of the moisturized molded sheets in non-water-absorptive package 8, such as in groups of 10 sheets each, as indicated in FIG. 6B.

As the dispersed moisture gradually infiltrates the above-mentioned packaged and sealed moisturized molded and initially baked sheets 6 with the passage of time, the overall moisture content of the moisturized molded sheets 6 increases to roughly 10–15% by weight. This results in a reduction in the degree of stickiness of the surface and the formation of softened molded sheets (designated by reference numeral 6A) that do not break or crack even if bent by external forces.

Figure 7:
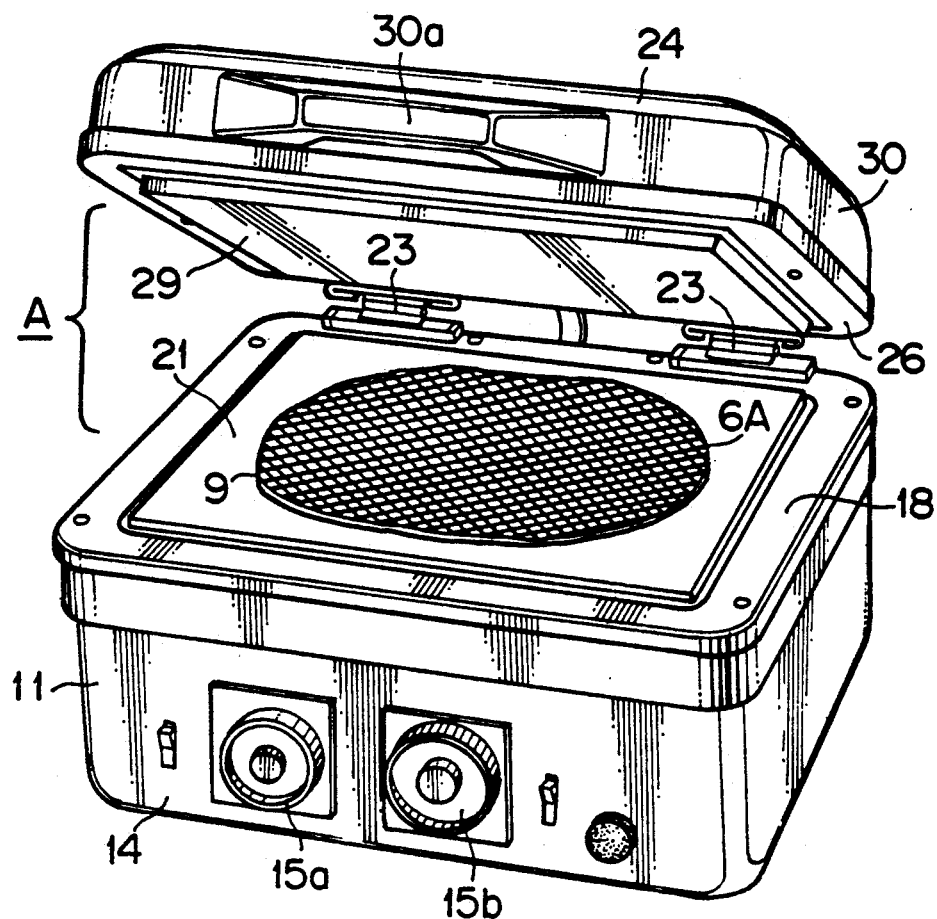
FIG. 7 is a cross-sectional view of an exemplary baking apparatus used in the final baking step of this invention.
Figure 8:
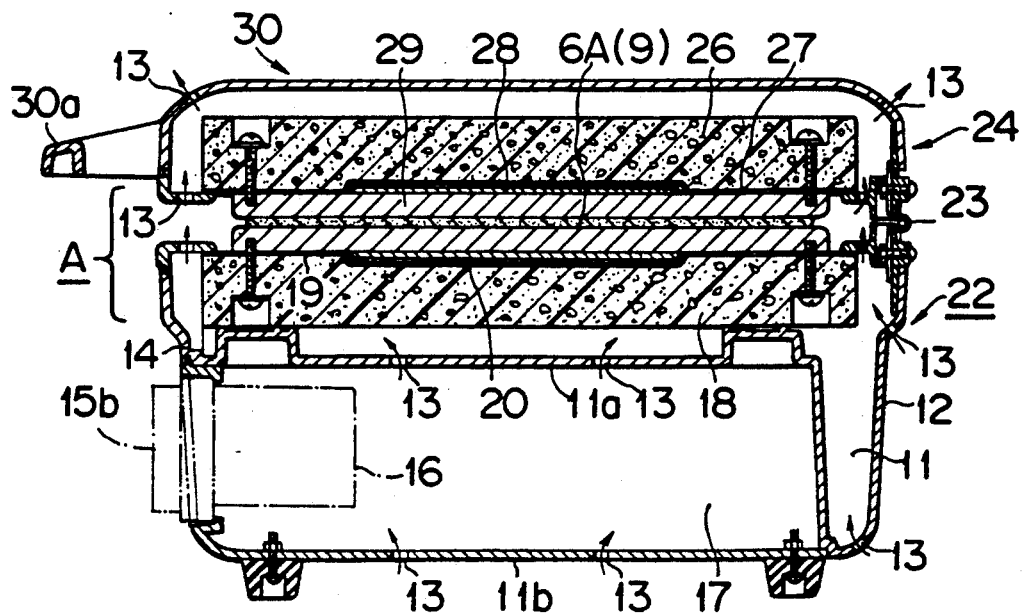
FIG. 8 is a cross-sectional view of the baking apparatus depicted in FIG. 7 and showing its manner of use.

The final baker A is employed by the user to bake the softened sheets 6A as indicated in FIG. 7 and FIG. 8. The peelable sheets 7, if present, are thus removed so that the softened molded sheets 6A may be baked as well as softened in the final baker A.

In addition to having a suitable number of respective ventilation holes 13 in upper plate 11a and lower plate 11b of lower case 11 (which is in the shape of a hollow, flat rectangle), the baker A includes a baking temperature controller 16, which is operated with a knob 15a which is externally exposed on front panel 14. The controller 16, however, is positioned in the internal space 17 immediately behind the front panel 14. In addition, baking unit 22 is equipped with a hot plate 21 which is centrally attached between resistance wire-heated reflective sheet 19 and heater 20. The baking unit 22 is provided with an adiabatic insulating material 18 mounted horizontally on the upper plate 11a of the lower case 11.

The final baker A suitable for use in the final baking according to the present invention can be equipped with a baker cover 30 and a hot plate 29 centrally attached between resistance wire-heated reflective sheet 27 and heater 28 on the lower surface of an adiabatic insulating material 26. The insulating material 26 is attached so as to cover the lower opening 25 of upper case 24. The upper and lower cases 24 and 11, respectively, are connected to one another with hinges 23 at the rear of the baking unit.

Baker A is preferably installed in frozen dessert retail establishments. The retailer may thus set and control heaters 20 and 28 in advance of baking by manipulation of knob 15a so as to achieve a power rating within a range of 110-150W which in turn controls the temperatures of hot plates 21 and 29. The desired baking time may then be set using knob 15b which emits an audible signal when the baking time has elapsed.

When heaters 20 and 28 have risen to a fixed temperature (e.g. between about 170° to 230° C.), baker cover 30 is pivotally opened (which is permitted by means of hinges 23) as indicated in FIG. 7. The above-mentioned softened molded sheet 6A is then placed on the heating plate 21. The baker cover 30 is thereafter closed by grabbing handle 30a. As a result, the softened molded sheet 6A is finally baked between heating plates 21 and 29. The operation of baking temperature controller 16 allows finally baked sheets to be made that are of a consistent texture.

Figure 9:
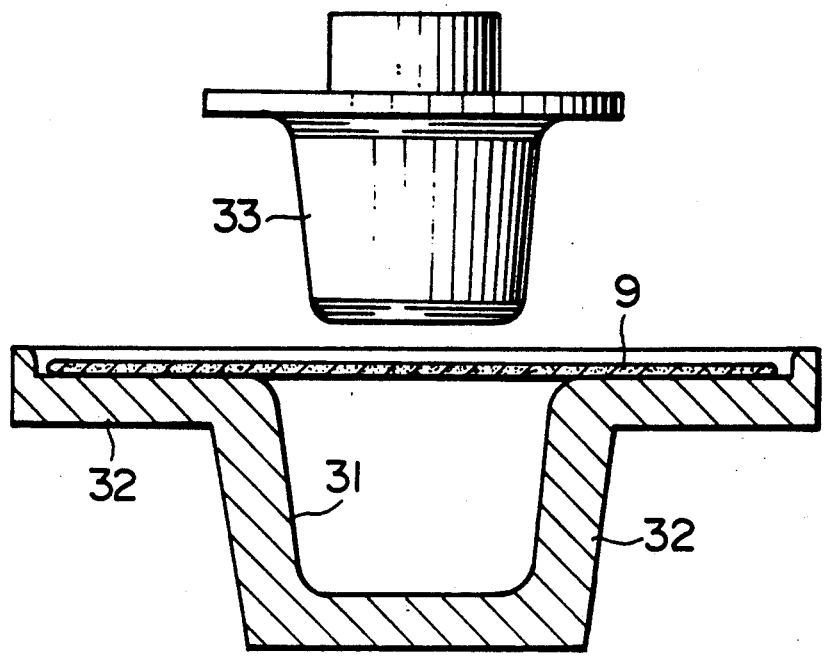
FIG. 9 is a cross-sectional view of a container mold showing the male and female mold members in a separated state.
Figure 10:
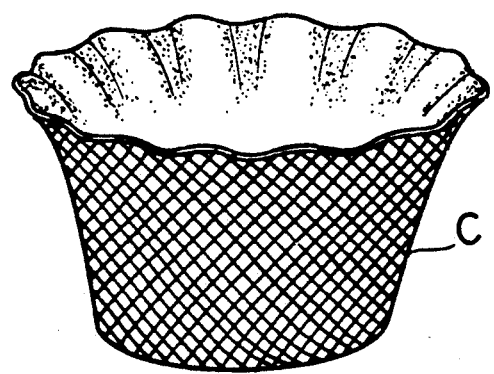
FIG. 10 is a perspective view of one example of an edible container obtained according to the present invention.

Cup-shaped edible container C can then be obtained by immediately forming the finally baked sheet as shown in FIG. 9. One possible form of the cup-shaped edible container C that results is depicted in FIG. 10. In this connection, as shown in FIG. 9, the final baked softened sheet 9 is laid on the upper surface of female mold 32 which includes a cup-shaped recess 31. Thereafter, the male mold 33 (having a shape that mates with the recess 31) is lowered into the recess 31 to obtain an edible container C having a crispy texture as indicated in FIG. 10. Furthermore, dish-shaped containers for tart confections can be obtained by using a female mold having a more shallow recess 31 and a male mold 33 having a relatively flat protruding surface.

If a grid pattern 4 is engraved in the heating plate 10, an edible container can thus be obtained which also has a grid pattern due to the grid pattern being imprinted on molded sheet 5 and moisturized molded sheet 6 during initial baking. The edible container C cools slightly simultaneously during molding and solidifies after molding. Since edible container C does not lose its shape, it can be sold at stores by using it as a serving dish for ice cream or like frozen confections. The purchaser can hold the edible container C which itself can be consumed sanitarily without becoming soiled after the ice cream within the edible container C has been eaten.

In addition, since moisturized molded sheet 6A and its softened molded sheet 6A are heated in advance, the wheat starch therewithin is alphatized resulting in the protein within the wheat flour forming a solid matrix to a certain extent. Since the moisture content is roughly 10-15% by weight, these molded sheets are resistant to impact and do not break or crack, thus allowing them to be delivered without damage occurring during transport. Moreover, since moisture is eliminated by adequate evaporation during initial baking, the molded sheets 5 can be peeled extremely easily from heating plate 10. Since moisturized molded sheets 6 and their softened molded sheet 6A are only given a moisture content of 10-15% by weight, the amount of heat required to remove moisture in the final heating process performed at the store of the ice cream retailer, or the like is minimal, and the amount of baking time at the retail store can be reduced considerably, thus solving the problem of heat dispersion.

The following provides a more detailed explanation of one preferred embodiment according to this invention.

Dough 2 is made by adequately stirring and mixing the following ingredients:

| | |
|---|---|
| Wheat flour | 100 |
| Sugar | 40 |
| Oil (palm oil) | 10 |
| Table salt | 0.2 |
| (also including slight amounts of egg, milk, coloring fragrance, etc.) | |
| Water | 100 |

When a harder dough is required, the amount of water may be reduced to 50. Dough 2 having the composition as noted above may then be poured and spread out on heating plate 10 (in which a grid pattern 4 has been formed containing vertical and horizontal lines at 10 millimeter intervals as indicated in FIG. 2) after the surface of the heating plate 10 has been pre-heated to roughly 180°-200° C. The other heating plate 10b is then pushed onto the supper surface of heating plate 10a by means of hinge 10c, after which the temperature of dough 2 sandwiched therebetween is maintained for a fixed period of time, for example 60 seconds, at 170°-200° C. After initial baking, the dough 2 becomes brown in color and the residual moisture content falls to 4% or less. Both heating plates 10a and 10b are opened and the molded sheet 5 is removed with scraper SC or a similar tool.

(A) The conditions for pouring and spreading out dough 2 and the initial baking process are as follows:
  (1) Amount of dough poured for a single baking: Approximately 25 cc;
  (2) Temperature of heating plates (upper and lower, 1 set): 180°-200° C.;
  (3) The gap between the two heating plates determined the thickness of the poured dough, and is to roughly be the thickness of the baked dough.

(B) The conditions for the final baking process is as follows:
  (1) Gap between heating plates: Selected so as to be the thickness of the final baked dough (disk-shaped baked product);
  (2) Baking temperature and time: 180° C.-200° C. (heating plate surface), time: 45-90 seconds;
  (3) Condition of baked dough (disk-shaped baked product);
  (4) Residual moisture of baked dough (as measured using a Ketter moisture meter);
  (5) The gap between the heating plates to be 2.5 mm in all cases;

(6) The baking temperatures are to be 180° C. or 200° C., and the baking times are to be 90 seconds at 180° C. or 60 seconds at 200° C.;
(7) The condition and residual moisture content of the baked and dried molded sheet 5 are as follows:
  (i) (170° C., 90 seconds) Brown, somewhat tinted with a yellow color, Somewhat hard, Residual moisture content: 4.0%
  (ii) (200° C., 60 seconds) Brown, Somewhat hard, Residual moisture content: 2.3%.

In any case, an initially baked and dried molded sheet 5 is obtained having a grid pattern consisting of 10 mm squares at a height dimension of roughly 1.5 mm formed on the surface.

Although the molded sheet 5 can be eaten as is since the wheat starch is alphatized, in the embodiment of the present invention being described, after the initially baked and dried molded sheet 5 is removed from the heating plate 10, it is transported to the moisturization station as indicated in FIG. 1. A moisturized molded sheet 6 is thus made by spraying water onto the initially baked and molded sheet 5 so that the water content becomes roughly 10-15%. The moisturized molded sheet 6 is then placed between non-water-absorbant peelable sheets 7 (which are preferably silicon-coated paper sheets), and stacked on top of other moisturized molded sheets 6. This procedure is then repeated until roughly 10 such moisturized molded sheets are stacked on top of each other, after which they are placed in non-water-absorbant package 8 (e.g., a plastics film package), sealed therein and transported to users.

The packaged and sealed moisturized molded sheets 6 become soft and moist due to the gradual infiltration of the previously sprayed moisture so that the overall moisture content of the sheets 6 becomes roughly 10-15%. The surface stickiness is reduced resulting in softened molded sheets 6A which do not become damaged or cracked even when bent by outside forces.

The user will peel the sheet 7 from softened molded sheets 6A and will then subject the sheets 6A to final baking. As a result of performing final baking, heat-dried softened sheets 9 are made by the softening fluid action of the sugar and oil contained therein. Immediately after formation of heat-dried softened sheets 9, edible container C (FIG. 10) is obtained having a crispy texture when eaten by forming the heat-dried softened sheets 9 into the shape of a cup or dish followed by cooling so as to effect solidification. The shape of the disk-shaped, heat-dried softened sheets 9 both before and after solidification is the same.

Different baking conditions will result in a slightly different texture when eaten. In addition, if the moisture content of the softened molded sheets 6A is 10%, final baking for roughly 20 seconds at 180° C. is required. On the other hand, if the moisture content is 15%, final baking for 35 seconds at the same temperature is required. As such, it can be clearly seen that the moisturizing conditions ultimately have a tendency to affect final baking.

In addition to cup-shaped edible containers, edible container C can also be formed into various other shapes, including cones, dishes and bowls.

The following advantages are a result of the present invention. Since the peeled molded sheets 5 become hard, brittle and susceptible to breakage if cooled as is, the present invention specifically contemplates spraying about 2 grams of water in the form of a moisturizing spray onto molded sheets to achieve a weight of, for example, 20 grams per sheet, such that the moisture content of the sheets is raised to between 10-15% by weight. This is followed by sealing in moisture-resistant packages 8 thereby allowing the formation of softened molded sheets 6A due to infiltration of moisture into the sheets over time. Since the softened molded sheets 6A are flexible to an extent that they can be bent, they are easily handled during storage and/or transport, and are free of breakage and cracking.

In addition, since the moisturized molded sheets 6 can be immediately packaged and sealed in moisture-resistant packages 8, and since they do not require any waiting time to dry, there is no bacterial contamination thereby allowing them to be shipped in a sanitary manner in the distribution process. The softened molded sheets 6A may thus be delivered to users, such as ice cream retailers, in bulk quantities (i.e., packaged stacks of 10 sheets per package) which do not adhere to each other due to the presence of moisture-resistant peelable sheets 7. The molded sheets 6A can be easily peeled from the stack one at a time for final baking and molding into cups and other shapes at the user side, thus offering additional advantages of the present invention.

When the softened molded sheets 6A are finally baked, nearly the entire moisture content of the molded sheets 6A is in the form of surface dampness. Thus, the amount of time required for final baking and drying can be significantly reduced in comparison to the molded sheets originally made having a moisture content of 10-15% since thermal transformation of the matrix of softened molded sheets 6A is not required. In addition, since the amount of heater electric power per sheet can be reduced to only about one-third, operating costs can be decreased resulting in greater economic feasibility.

Finally, by promptly forming heat-dried softened sheets 9 immediately following final baking, drying and softening into cup shapes and solidifying due to the softening fluid action of the sugar and oil contained therein, sanitary edible containers can be made. In addition, since these edible containers can be sold promptly, the amount of time customers must for their order is shortened as much as possible.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of producing an edible container comprising the steps of:
   (a) initially baking a farinaceous batter mixture consisting essentially of sugar, oil and flour by sandwiching an amount of the batter mixture between a pair of heated platens and then heating and baking the batter mixture sandwiched between the heated platens to effect alphatization of starch in the batter mixture and to evaporate moisture to obtain a dewatered initially baked edible sheet;
   (b) moisturizing the initially baked edible sheet;
   (c) sealing the moisturized initially baked edible sheet within a non-water-absorptive packaging material;
   (d) allowing the moisturized sheet to become softened within the sealed packaging material;
   (e) removing the softened and moisturized sheet from the packaging material;

(f) finally baking the softened sheet removed from the packaging material; and
(g) forming the baked softened sheet into an edible container.

2. A method as in claim 1, wherein step (a) includes heating the platens to a temperature within the range of 170° to 220° C.

3. A method as in claim 1, wherein step (a) is practiced such that the initially baked edible sheet has a moisture content of about 3 wt. %.

4. A method as in claim 1, wherein step (b) includes spraying water on both sides of said initially baked edible sheet.

5. A method as in claim 1 or 4, wherein step (b) is practiced so as to increase the moisture content of the initially baked edible sheet to between about 10 to 15 wt. %.

6. A method as in claim 1 or 4, wherein step (b) is practiced so that about 2 grams of water are sprayed onto the initially baked edible sheets.

7. A method as in claim 1 or 4, wherein step (b) is practiced so that said initially baked edible sheet achieves a weight of about 20 grams.

8. A method as in claim 1, wherein between steps (a) and (b) there is practiced the step of removing the initially baked edible sheet from the heated platens.

9. A method as in claim 8, wherein said step of removing the initially baked edible sheet includes scraping the sheet from one of the heated platens so that the sheet is removed in one piece.

10. A method as in claim 8, further comprising the step of conveying the removed edible sheet to a moisturizing station.

11. A method as in claim 1, wherein step (g) is practiced so as to form one of cup-shaped, dish-shaped or cone-shaped edible containers.

12. A method as in claim 1, wherein step (g) is practiced using a female mold cavity sized and configured to form the edible container and a male member which mates with the female mold cavity.

13. A method as in claim 1, wherein step (c) is practiced so as to seal a single initially baked edible sheet within the packaging material.

14. A method as in claim 1, wherein step (c) is practiced by stacking a number of said moisturized initially baked edible sheets and then sealing the stack of moisturized initially baked edible sheets within the packaging material.

15. A method as in claim 14, which includes interposing a non-stick peelable sheet between adjacent ones of the edible sheets in the stack.

* * * * *